March 18, 1952 H. B. WOLCOTT, JR 2,589,650
AUTOMATIC VALVE CONTROL MEANS FOR WATER SOFTENERS
Filed Dec. 6, 1947 2 SHEETS—SHEET 1

INVENTOR.
Herbert B. Wolcott, Jr.
BY
ATTORNEY

March 18, 1952     H. B. WOLCOTT, JR     2,589,650
AUTOMATIC VALVE CONTROL MEANS FOR WATER SOFTENERS
Filed Dec. 6, 1947            2 SHEETS—SHEET 2

INVENTOR.
Herbert B. Wolcott, Jr,
BY
Chas W Girard
ATTORNEY

Patented Mar. 18, 1952

2,589,650

UNITED STATES PATENT OFFICE 2,589,650

AUTOMATIC VALVE CONTROL MEANS FOR WATER SOFTENERS

Herbert B. Wolcott, Jr., Columbia, Mo.

Application December 6, 1947, Serial No. 790,046

5 Claims. (Cl. 222—20)

The present invention relates to water softening apparatus, in which water softening material is used for treatment of hard water for softening purposes and which material, in turn, requires to be regenerated at intervals for restoring its water-softening properties.

Accordingly a primary object of the present invention is to provide practical and efficient means for regulating the period of time allowed to take place for the regenerating treatment of the water-softening material, and at the conclusion of such period to automatically restore the apparatus to normal operative condition.

For accomplishing this purpose of the invention, a novel and improved type of control means is provided which includes a double acting form of valve which is mounted in the service line in position to control not only the usual service flow but also a waste or drain outlet, and adapted to be set for operation in response to the flow of water through said drain outlet and to operate automatically to close the drain outlet after a given period of operation and simultaneously to open the valve outlet to the service line.

As the preferred embodiment of construction for accomplishing said purposes of the invention I provide a waterflow-actuated form of motor arranged to be actuated by the flow of waste water through the drain outlet, and having appropriate drive connections for actuating the aforesaid double acting valve in the required manner for controlling both the drain outlet and the outlet to the service line.

A further object of the invention is to include an automatically acting bypass valve construction adapted to provide for a continuation of the flow of water through the service line during the period of time required for the regenerating cycle, and deriving such flow through the medium of a supplemental connection with the main water supply line.

Having the aforementioned general objects in view, the invention will now be described by reference to the accompanying drawings, wherein is illustrated one practical form of construction which has been devised for accomplishing the desired purposes of the invention, after which those features and combinations deemed to be novel and patentable will be particularly set forth and claimed.

In the drawings—

Figure 2:
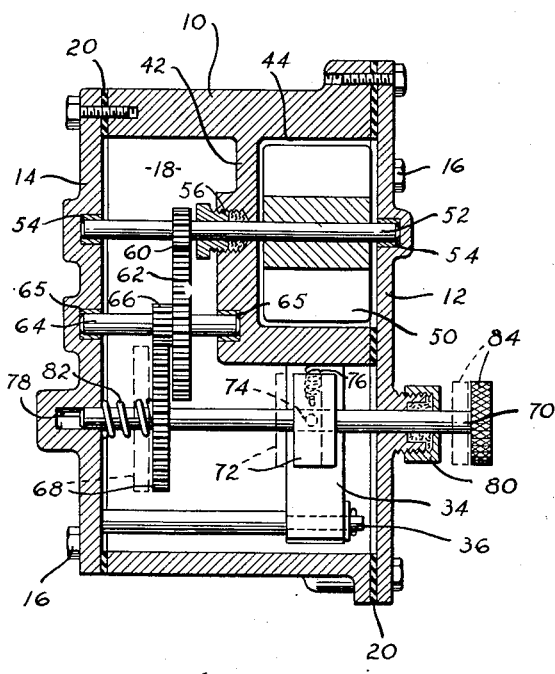
Figure 2 is a transverse sectional view, representing a section taken on the line 2—2 of Figure 1.
Figure 3:
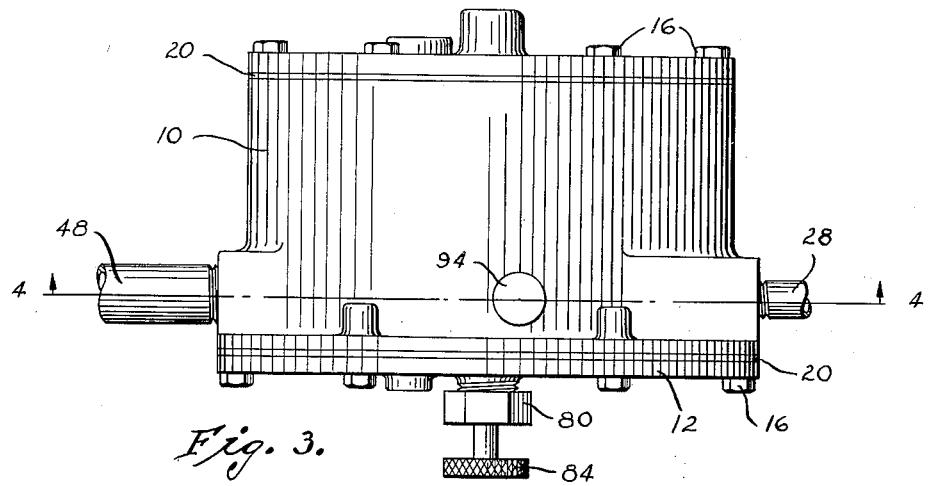
Figure 3 is a plan view illustrating said valve control unit or assembly.

Referring now to the accompanying drawings in detail, the improved valve control and regulating means is illustrated therein as comprising a casing member 10 provided with cover plates 12, 14, which are secured to opposite sides of the casing by suitable screws 16, thus forming a water flow chamber 18 which is made watertight by means of gaskets or packing material 20, as shown in Figure 2. This chamber 18 is provided with an inlet opening 22 and a pipe connection 24 or the like leading from the water softener unit (not shown), and also with an outlet passage 26 which is adapted for a connection 28 with the water service line (see Figure 4).

Figure 4:
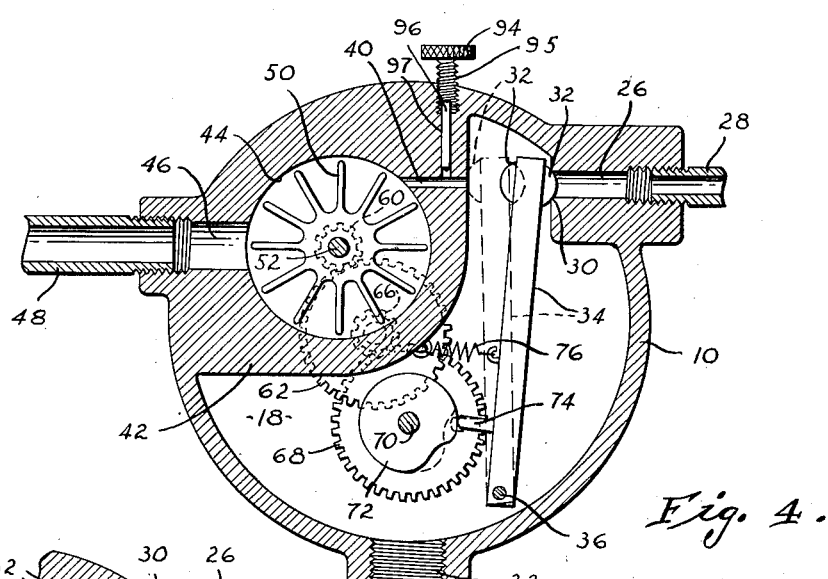
Figure 4 is a vertical sectional view, representing a section taken on the line 4—4 of Figure 3.

The inner end of the outlet passage 26 constitutes a valve seat as indicated at 30, adapted to be engaged by a valve closure member 32 carried by the free end of a valve arm 34 which is mounted on a fixed pivot pin 36 in the lower portion of the flow chamber 18. This valve arm 34 also carries a second valve closure member 32 for engagement with a valve seat 38 at the inner end of a drain port or passage 40 which is located in alinement with the outlet passage 26, as illustrated in Figure 4. The drain passage 40 is provided in a partition structure, indicated generally by the reference numeral 42, and forming part of the casing member 10, and is so constructed as to provide an impeller chamber 44 communicating with said drain passage 40 and also with a drain outlet passage 46 leading to the exterior of the unit, where it is tapped for a suitable drain outlet or discharge connection 48.

Within the impeller chamber 44 is mounted a turbine or water wheel 50 carried by a shaft 52 located opposite the discharge outlet 46 but below the aforesaid drain passage 40. The opposite ends of this shaft 52 are journaled in bearing recesses 54 in the cover plates 12 and 14, and its intermediate portion extends through a packing gland 56 in the partition structure 42, which serves to maintain an effective seal between the chambers 18 and 44. Obviously the position of the wheel or impeller member 50 is such as to cause the same to be rotated by any flow of water through the chamber 44 from the drain passage 40 to the outlet passage 46, which rotative movement will be in a counter-clockwise direction as viewed in Figure 4 of the drawings. This rotative movement is utilized for the purpose of controlling the movements of the valve arm 34, through the medium of connections now to be described.

That portion of the shaft 52 which is located in the chamber 18 is provided with a pinion gear element 60, which meshes with a gear 62 mounted on a countershaft 64 journaled in bearings 65, as illustrated in Figure 2 of the drawings. The shaft 64 also carries a pinion gear 66 which meshes with a gear on a shaft 70, which is also provided with a cam element 72 adapted for making operative engagement with a lug or pin 74 which is fixed to the lower portion of the valve arm 34. This arm 34 is also engaged by a coil retracting spring which is attached to the partition structure 42, in such a way as to maintain said pin or lug 74 continuously engaged with the cam 72.

Moreover, as illustrated in Figure 2, the shaft 70 is slidingly mounted in a bearing recess 78 at one end, and a packing gland bearing structure 80 at its opposite end, for permitting disengagement of the gear elements 66 and 68, without interruption of the engagement of the cam 72 with said pin or lug 74—as indicated by the dotted lines in Figure 2—for a purpose hereinafter explained. A coil spring 82 on said shaft 70 intermediate the gear 68 and the adjacent bearing recess 78 serves to maintain said shaft normally in position for meshing its gear 68 with the gear pinion 66, as represented by the full lines in Figure 2. An exterior knob 84 is provided on the outer end of the shaft 70 for manipulating the same as required for the cam adjustment hereinafter referred to.

With the construction as above described, it will be understood that when the water softener system is in normal operation, the valve 32 will be in the dotted line position shown in Figure 4 of the drawings, thereby closing the drain outlet port and leaving the outlet passage 26 open, as required for normal soft water service operation.

Figure 1:
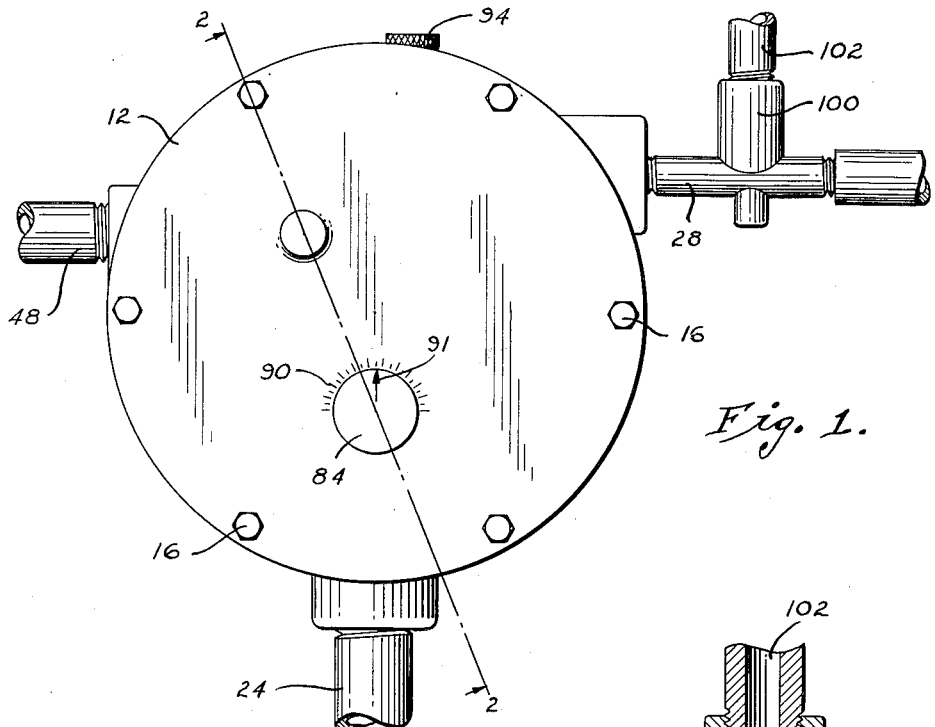
Figure 1 is an elevation illustrating a valve control unit or assembly adapted for the carrying out of the purposes of the present invention, and the water-flow connections designed to be made thereto.

When the water softener apparatus is to undergo the regenerative cycle, this requires the flushing out of the regenerative materials, thereby necessitating the closing of the outlet passage 26 and opening of the drainage passage 40, as represented by the full lines in Figure 4. To set the unit for the flushing period, the knob 84 is pushed inwardly to disengage the gear elements 66 and 68 and then rotated to turn the cam element 72, which actuates the valve arm 34 against the pull of the spring 76 and into position for closing the outlet passage 26 and opening the drainage passage 40; at the same time the knob is also turned into proper position for predetermining the interval of operation to take place for the carrying out of the flushing operation. This is accomplished by regulating the position of the cam element 72; thus a longer or shorter period may be determined by the setting of said cam element, which may be conveniently indicated by a suitable scale 90 and pointer 91 associated with said knob 84, as indicated in Figure 1.

The drainage flow which is now established through the passage 40 and the chamber 44 produces rotation of the wheel 50, thereby driving the gear connections to the cam shaft 70, and the resulting rotative movement of the cam is determined by the amount of water or drain flow which is permitted to pass through said chamber 44 for turning the cam into position for releasing the valve arm 34 to the pull of the spring 76, thereby automatically returning said arm 34 to initial position for again closing the drain outlet and opening up the outlet passage 26, and thus restoring the normal soft water service.

A further adjustment of the operative interval required for completing the flushing cycle may also be obtained by adjusting the amount of the drainage flow taking place through the drain passage 40. This is accomplished by providing a type of needle valve, comprising an exterior knob portion 94 having a shank portion 95 threaded into the casing structure and an interior valve stem 96 projecting through a bore 97 communicating with said passage 40; thus, by turning said knob the inner end of the valve may be projected into position for varying to any desired extent the effective waterflow therethrough into the impeller chamber 44, which in turn, of course, serves to regulate to the same degree the resultant rotative movement of the impeller wheel 50.

From the foregoing, therefore, it will be understood that at the start of the regenerative cycle, it is only necessary for the attendant to push the knob 84 inwardly to the dotted line position illustrated in Figure 2, which disengages the gear elements 66 and 68 and thus leaves the shaft 70 free for turning and setting the cam 72 by the operation of said knob; i. e., the cam is first actuated to move the valve arm 34 (against the pull of the spring 76) into position for closing the passage 26 and opening up the drain passage 40. The knob is then further rotated for the purpose of setting the cam at the proper point (as may be determined by reference to the scale markings 90) corresponding to the interval it is desired to have elapse before discharge duct 26 is opened by the cam completing a full turn back to its initial position, after which the knob is released, resulting in the spring 82 returning the shaft 70 to its original position and reengaging the gear elements 66 and 68. The flow of the drain water from the chamber 18 out through said passage 40 and on through the chamber 44 will then actuate the water wheel 50 and thereby drive the connections to the cam shaft 70 until the completion of the interval referred to, when the cam will automatically release the valve arm 34, whereupon the spring 76 will again return said arm to the position represented by the dotted lines in Figure 4, thus cutting off the drainage flow and restoring the flow of water from the chamber 18 out through the passage 26 to the soft-water service line.

Figure 5:
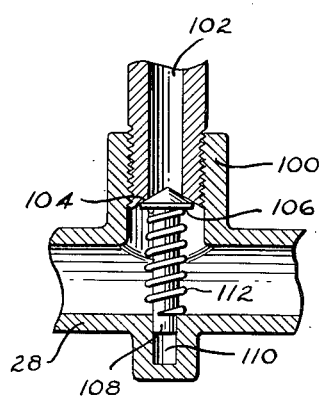
Figure 5 is a detail sectional view of the bypass valve feature of the construction.

It is often desirable that the flow of water to the soft water service line be not entirely cut off during the regenerative cycle, even though such temporary service can be supplied only by unsoftened water. Accordingly provision is made in connection with the above-described construction for maintaining such supplemental flow of water continuously available. For this purpose the connection 28 hereinbefore referred to may comprise a unit or fitting provided with a nipple 100 for receiving a pipe connection (see Figures 1 and 5) which may be a bypass connection from the hard water supply line. The intake end of this pipe connection 102 may thus be utilized as a valve port as indicated at 104, for engagement by a valve head 106 on the end of a stem 108 slidingly engaging a recess or guide passage 110 arranged in alinement with the center of said valve port. As shown in Figure 5, a coil spring 112 is arranged about said valve stem 108 in position for maintaining the valve head normally in engagement with the valve seat surrounding the port 104. With this arrangement and construction, under normally operating conditions the pressure exerted by said spring may be made sufficient to counterbalance the line pressure by way of the bypass connection 102, whereas during the regenerative process (when the passage 26 is closed by the valve 32) any reduction in the pressure on the inner face of the valve 106, due to opening of any of the outlets in the soft-water service line, will obviously result in the automatic opening of said valve, and thus admit the necessary supplemental flow of water through the bypass connection into the service line.

Figure 6:
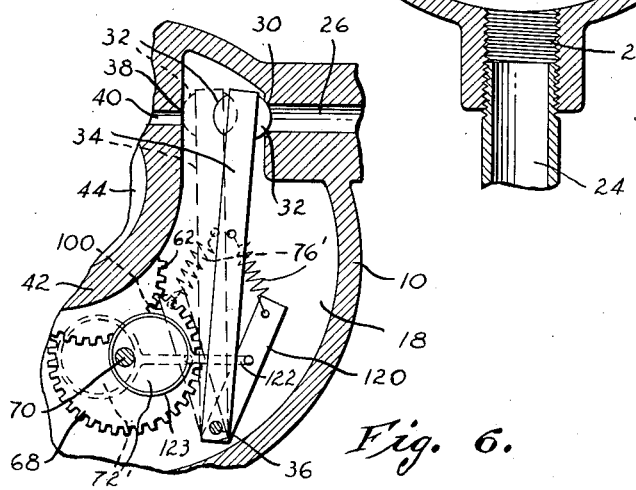
Figure 6 is a detail sectional view illustrating a modified form of the valve actuating means.

In Figure 6 I illustrate a modified form of operative connection between the cam element 72 and the valve arm 34, for promoting a quick or snap action as regards the valve opening and closing movements of said arm. This modified construction comprises a supplemental operating arm 120 pivotally mounted on the fixed pin or arm 36 and provided with a coil spring connection 76' with the valve arm 34; in turn, said arm 120 is provided with an operating link 122 with a strap 123 engaged with a cam element 72' on the shaft 70. With such a construction, it will be evident that as the operative movement of the cam produces movement of the arm 120 past center in either direction, the spring will effect a snap-action movement of the valve arm 34 in either direction of the operation, as indicated by the dotted lines in said Figure 6.

From the foregoing, therefore, it will be apparent that a practical and highly efficient arrangement and construction have been devised for the carrying out of all the aforesaid objects of the invention. The unit or assembly comprising the water wheel and its connections provides for setting the operation for the regenerative cycle for any desired operative or drainage interval according to the operation and setting of the knob 84, at the conclusion of which interval the water softening operation is restored to its normal state automatically without any attention on the part of the householder or other person. Again, the improved construction includes a simple provision for maintaining a continuous supply of water available by way of the described bypass connection between the main water supply line and the soft water service line. Ordinarily such water supply is completely interrupted or cut off during the period of regeneration, whereas it is desirable and often important to have some water service available for emergency needs, even though such water is not softened, for the relatively short intervals required for the regenerating process. The improved construction provides a simple means of rendering such temporary service automatically and continuously available without requiring any other change whatsoever in the equipment or any manipulation of valve connections, and also without interfering in any way with the regular functions of the apparatus as regards the water softening and regenerating operations.

While the foregoing sets forth what has been found to constitute a most practical and efficient as well as economical form of construction for embodying the aforesaid features of improvement, I desire to be understood as reserving the right to make such changes or modifications therein as may fairly be deemed to fall within the spirit and scope of my invention as defined by the appended claims.

Having thus described the invention, what I claim is:

1. Valve controlling means for water softening apparatus, comprising a casing structure providing a water flow chamber having water intake and service outlet passages for a water softener unit and a soft water service line respectively and also having a water drainage outlet passage, said drainage outlet and service outlet passages having adjoining ports facing each other in slightly spaced relation, a valve arm and closure member mounted for rocking movement for alternately opening and closing said drainage outlet and said service outlet ports, means for maintaining said valve arm and closure member normally in closed relation to said drainage outlet port, and valve control means operative to mechanically engage and hold said valve arm and closure member temporarily in closed relation to said service outlet port and actuated by the flow of water out through said drainage outlet port for releasing the valve arm and closure member to the action of said first means to move the valve arm and closure member into closed relation to the drainage outlet port.

2. Valve controlling means for water softening apparatus, comprising means providing a water flow chamber having water intake and outlet passages for a water softener unit and a soft water service line respectively and also having a water drainage outlet, a valve arm and closure member operative for alternately opening and closing said drainage outlet and said service outlet passage, and valve operating means actuated by the water flowing through said drainage outlet and provided with adjustable mechanically operating connections for positively engaging and actuating said valve member in its movement for closing said service outlet passage.

3. Valve controlling means for water softening apparatus, comprising a casing structure providing a water flow chamber having water intake and outlet passages for a water softener unit and a soft water service line respectively and also having a water drainage outlet, a valve arm and closure member operative for alternately opening and closing said drainage outlet and said service outlet passage, and an impeller wheel actuated by the water flowing out through said drainage outlet and provided with operating connections including cam means for engaging and positively controlling the movements of said valve arm and closure member.

4. Valve controlling means for water softening apparatus, comprising means providing a water flow chamber having water intake and outlet passages for a water softener unit and a soft water service line respectively and also having a water drainage outlet opposite said service outlet passage, a valve arm and closure member mounted for operation between said drainage outlet and said service outlet passage for alternately opening and closing the same, an impeller wheel actuated by the flow movement of water out through said drainage outlet, and an adjustable cam device for engaging and positively controlling the movements of said valve arm and closure member and provided with drive means actuated by said impeller wheel.

5. Valve controlling means for water softening apparatus, comprising means providing a water flow chamber having water intake and outlet passages for a water softener unit and a soft water service line respectively and also having a water drainage outlet, a valve arm and closure member operative for alternately opening and closing said drainage outlet and said service outlet passage, an impeller wheel actuated by the water flowing out by way of said drainage outlet, a cam device operative to control the movements of said valve arm and closure member and provided with driving means actuated by said impeller wheel, and manual means for disconnecting said cam device from its driven relation and adjusting said device into various operative positions with relation to the valve arm and closure member.

HERBERT B. WOLCOTT, Jr.

REFERENCES CITED

The following references are of record in the file of this patent:

UNITED STATES PATENTS

| Number | Name | Date |
| --- | --- | --- |
| 1,319,992 | Dieter | Oct. 28, 1919 |
| 1,859,357 | Elder | May 24, 1932 |

FOREIGN PATENTS

| Number | Country | Date |
| --- | --- | --- |
| 552,593 | Great Britain | Nov. 7, 1941 |